(12) United States Patent
Kaneko et al.

(10) Patent No.: US 6,586,891 B2
(45) Date of Patent: Jul. 1, 2003

(54) HIGH-INTENSITY DISCHARGE LAMP AND HIGH-INTENSITY DISCHARGE LAMP OPERATING APPARATUS

(75) Inventors: Yuriko Kaneko, Nara (JP); Kiyoshi Takahashi, Osaka (JP); Ryo Minamihata, Hyogo (JP); Mamoru Takeda, Kyoto (JP); Hideaki Kiryu, Osaka (JP); Takayuki Murase, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/874,779

(22) Filed: Jun. 5, 2001

(65) Prior Publication Data

US 2002/0163315 A1 Nov. 7, 2002

(30) Foreign Application Priority Data

Jun. 6, 2000 (JP) ........................................ 2000-169656

(51) Int. Cl.[7] .............................................. H05B 41/24
(52) U.S. Cl. ........................ 315/246; 315/57; 315/150; 315/360
(58) Field of Search ...................... 315/246, 46, 56, 315/57, 70, 71, 134, 276, 283, 291, 307, 308, 360, DIG. 2, DIG. 5, DIG. 7, 149, 150, 151, 156

(56) References Cited

U.S. PATENT DOCUMENTS

| 4,179,640 A | * | 12/1979 | Larson et al. ............... 313/636 |
| 4,721,888 A | * | 1/1988 | Proud et al. ................. 315/150 |
| 4,992,703 A | * | 2/1991 | Ramaiah ...................... 315/124 |
| 6,054,810 A | | 4/2000 | Yamamoto et al. .......... 313/607 |
| 6,069,456 A | | 5/2000 | Fromm et al. ............... 315/248 |

FOREIGN PATENT DOCUMENTS

| EP | 0 883 160 A1 | 12/1998 |
| EP | 0 903 770 A2 | 3/1999 |
| JP | 56132760 A | 10/1981 |
| JP | 60074257 A | 4/1985 |
| JP | 05054983 A | 3/1993 |
| JP | 06084504 A | 3/1994 |
| JP | 06162994 A | 6/1994 |
| JP | 06333684 A | 12/1994 |
| JP | 08069777 A | 3/1996 |
| JP | 10134773 A | 5/1998 |
| JP | 10294085 A | 11/1998 |
| JP | 11111230 A | 4/1999 |
| JP | 2001357987 A | 12/2001 |

* cited by examiner

*Primary Examiner*—Don Wong
*Assistant Examiner*—Thuy Vinh Tran
(74) *Attorney, Agent, or Firm*—Harness, Dickey & Pierce, P.L.C.

(57) ABSTRACT

A high-intensity discharge lamp includes an arc tube including a pair of electrodes opposed to each other therein; and a trigger wire made of a conductive material provided in an outer circumference of the arc tube. The trigger wire is turned to be in a conductive state with one electrode of the pair of electrodes when a start-up voltage is applied across the pair of electrodes, and discharge is started between the pair of electrodes in a state where an electrical field is formed between the trigger wire that is in the conductive state and the other electrode of the pair of electrodes.

12 Claims, 9 Drawing Sheets

Current flowing through trigger wire

Voltage applied across electrodes

Voltage applied to trigger wire

Voltage applied across electrodes

HIGH-INTENSITY DISCHARGE LAMP AND HIGH-INTENSITY DISCHARGE LAMP OPERATING APPARATUS

BACKGROUND OF THE INVENTION

The present invention relates to high-intensity discharge lamps and high-intensity discharge lamp operating apparatuses. In particular, the present invention relates to high-intensity discharge lamps such as metal halide lamps, high pressure mercury lamps, and high pressure sodium lamps that are provided with a trigger wire.

Conventionally, high-intensity discharge lamps such as metal halide lamps have been used for general illumination or spot illumination. In recent years, they are also widely used as a light source of OHPs and liquid crystal projectors.

A metal halide lamp includes, for example, an arc tube (luminous bulb) made of quartz glass and a pair of electrodes spaced apart with a predetermined distance in the arc tube, and mercury and a metal halide are enclosed as luminous materials in the arc tube. The arc tube is sealed with electrode sealing portions at both ends, and the pair of electrodes are connected to respective external lead wires via metal foils hermetically sealed in the electrode sealing portions. The external lead wires are electrically connected to an operating circuit (driving device) of the lamp. The operating circuit includes a ballast for restricting current flow to less than a predetermined amount during operation and means for applying a high-voltage pulse voltage.

The lighting operation of metal halide lamps is as follows. In order to start lighting operation, first, it is necessary to apply a voltage to the pair of electrodes to cause insulation breakdown to start discharge. A voltage necessary to cause the insulation breakdown is called "breakdown voltage", and the breakdown voltage is generally a high voltage of several hundreds times higher than the lamp voltage during steady-state operation.

In order to achieve the compactness and the low cost of the operating circuit, it is preferable that the breakdown voltage is as low as possible. As a technique for lowering the breakdown voltage, a configuration where a trigger wire (close conductor) is wound around the outer circumference of the arc tube is known, which is disclosed in Japanese Laid-Open Patent Publication No. 8-69777, for example. FIG. 11 shows a metal halide lamp having this configuration.

The metal halide lamp shown in FIG. 11 has an arc tube 101 and electrode sealing portions 102a and 102b, and a trigger wire 108 having a first end 108a and a second end 108b is spirally wound around the circumference of the arc tube 101. A pair of electrodes 103a and 103b are opposed to each other inside the arc tube 101. The pair of electrodes 103a and 103b are connected to external lead wires 105a and 105b via the metal foils 104a and 104b in electrode sealing portions 102a and 102b. The second end 108b of the trigger wire 108 is connected to the external lead 105b, and the first end 108a of the trigger wire 108 is wound around the end (near the base) of the electrode sealing portion 102a on the side of the arc tube 101. The external lead wires 105a and 105b are electrically connected to an operating circuit (driving device) 111, and the operating circuit 111 is electrically connected to a power supply 107.

This metal halide lamp is provided with the trigger wire 108, so that the breakdown voltage can be reduced. This is caused by the following mechanism. When a high-voltage pulse voltage is applied from the operation circuit 111 connected to the power supply 107 to the electrodes 103a and 103b, the trigger wire 108 has the same electric potential as that of the electrode 103b. As a result, the trigger wire 108 causes an electrical field having a large electric potential gradient to be formed inside the arc tube 101. This electrical field is likely to cause insulation breakdown of Xe gas between the electrodes 103a and 103b and thus the breakdown voltage can be reduced.

However, in the case of the conventional metal halide lamp provided with the trigger wire 108, although the breakdown voltage can be reduced, color change, an increase of the lamp voltage, or devitrification, which is a phenomenon that the transparency is lost by opaqueness of the arc tube, may occur during operation of the lamp. Furthermore, the luminous flux maintenance factor is reduced, or the lamp cannot be turned on, and thus the lifetime of the lamp tends to be reduced.

As a result of the factors causing the above-described phenomena in depth, the inventors of the present invention found that the electrical field generated by the trigger wire 108 is a large factor. For example, in the case where a driving voltage (lamp voltage) of 65V is applied across the electrodes 103a and 103b during operation, the voltage between the trigger wire 108 connected to the external lead wire 105b and the electrode 103a is also 65V. When the distance between the electrodes 103a and 103b is 3.7 mm, the shortest distance between the first end 108a of the trigger wire 108 and the electrode 103a is 1 mm, then the electric potential gradient of the electrical field formed between the electrodes 103a and 103b is 17.6V/mm. On the other hand, the electric potential gradient of the electrical field formed between the electrode 103a and the trigger wire 108 is 65V/mm, which is more than three times higher than 17.6V/mm, in the largest portion.

In the lamp where a high-voltage pulse voltage is applied, the insulation breakdown of Xe gas is caused, and thus discharge is started, the temperature of the inner wall of the arc tube 101 is increased by subsequent discharge. When the temperature of the inner wall of the arc tube 101 is increased, enclosed material such as metal halide enclosed in the arc tube 101 is evaporated and further ionized. The ionized luminous material is affected more by the electrical field between the trigger wire 108 and the electrode 103a than by the electrical field between the electrodes 103a and 103b, and thus attracted more to the trigger wire 108. More in details, in the case where the applied driving voltage is alternating voltage, when the trigger wire 108 is in the negative electric potential, the luminous material such as sodium in the form of positive ions are attracted to the trigger wire 108, and sodium having a small ion radius moves in the quartz glass and leaks out of the arc tube 101. Thus, the amount of the luminous material in the arc tube 101 is reduced, so that the optical characteristics (color temperature, lamp voltage, luminous flux maintenance factor etc.) are significantly changed, which was found by the inventor of the present invention. Furthermore, sodium or the like breaks the amorphous structure of the quartz glass while moving in the quartz glass, and crystallization of the quartz glass (phase transition to cristobalite) occurs, which causes opaqueness or devitrification of the quartz glass.

SUMMARY OF THE INVENTION

Therefore, with the foregoing in mind, it is a main object of the present invention to prolong the lamp lifetime of a high-intensity discharge lamp provided with the trigger wire.

A high-intensity discharge lamp of the present invention includes an arc tube including a pair of electrodes opposed to each other therein; and a trigger wire made of a conductive material provided in an outer circumference of the arc tube. The trigger wire is turned to be in a conductive state with one electrode of the pair of electrodes when a start-up voltage is applied across the pair of electrodes, and discharge is started between the pair of electrodes in a state where an electrical field is formed between the trigger wire that is in the conductive state and the other electrode of the pair of electrodes.

In one embodiment of the present invention, a part of the trigger wire is arranged close to an external lead wire in an insulating state, the external lead wire being electrically connected to the one electrode, and when the start-up voltage is applied, insulation breakdown is caused between the part of the trigger wire and the external lead wire to establish the conductive state.

It is preferable that the part of the trigger wire is arranged close to the external lead wire with a distance of less than 3 mm.

In one embodiment of the present invention, the part of the trigger wire is insulated from the external lead wire with air.

In one embodiment of the present invention, an insulating tape is provided between the part of the trigger wire and the external lead wire for insulation.

In one embodiment of the present invention, the high-intensity discharge lamp further includes a pair of sealing portions for sealing ends of the pair of electrodes, the sealing portions extending from the arc tube, wherein the trigger wire is wound around a region between the arc tube and one of the pair of sealing portions that seals an end of the other electrode.

It is preferable that the arc tube is made of quartz glass.

In one embodiment of the present invention, a metal halide is enclosed as a luminous material in the arc tube, and the metal halide includes an alkaline metal halide.

In one embodiment of the present invention, the alkaline metal halide is a sodium halide.

According to another aspect of the present invention, a high-intensity discharge lamp operating apparatus includes a high-intensity discharge lamp including an arc tube including a pair of electrodes opposed to each other therein, and a trigger wire made of a conductive material provided in an outer circumference of the arc tube; an operating circuit for operating the high-intensity discharge lamp. The trigger wire is not electrically connected to either one of the pair of electrodes. The operating circuit includes driving voltage applying means for applying a driving voltage for maintaining discharge after the discharge is started between the pair of electrodes, and start-up voltage applying means for applying a start-up voltage for starting discharge between the pair of electrodes. The trigger wire is electrically connected to the start-up voltage applying means, and each of the pair of electrodes is electrically connected to the driving voltage applying means.

In one embodiment of the present invention, the start-up voltage applying means includes a timer for controlling the start-up voltage applying means so as to apply the start-up voltage to the trigger wire for a predetermined time during start-up.

In one embodiment of the present invention, the start-up voltage applying means includes detecting means for detecting that lamp operation is started by discharge between the pair of electrodes; and controlling means for stopping application of the start-up voltage when the detecting means detects that lamp operation is started.

In one embodiment of the present invention, the detecting means is a voltage detector that detects a change in voltage between the pair of electrodes.

In one embodiment of the present invention, the detecting means is a current detector that detects a change in current flowing between the pair of electrodes.

In one embodiment of the present invention, the high-intensity discharge lamp further includes a pair of sealing portions for sealing ends of the pair of electrodes, the sealing portion extending from the arc tube, and the trigger wire is wound around a region between one of the pair of sealing portions and the arc tube.

It is preferable that the arc tube is made of quartz glass.

In one embodiment of the present invention, the high-intensity discharge lamp is a metal halide lamp in which a metal halide including an alkaline metal halide is enclosed as a luminous material in the arc tube.

In the present invention, when a start-up voltage is applied across the pair of electrodes, the trigger wire is turned to be in a conductive state with respect to one of the electrodes. Therefore, the breakdown voltage can be lowered, and changes in the characteristics of the lamp can be prevented. As a result, the lamp lifetime of the high-intensity discharge lamp provided with the trigger wire can be prolonged. A part of the trigger wire is arranged close to the external lead wire in an insulating state, so that insulation breakdown is caused between the part of the trigger wire and the external lead wire when a start-up voltage is applied. With this simple configuration, the effects of the present invention can be obtained.

Furthermore, in the case where a portion where the trigger wire is wound around is provided in a region between the sealing portion and the arc tube, the intensity of the electrical field generated by the trigger wire can be large. Therefore, with a comparatively low voltage, the high-intensity discharge lamp can be started more reliably. Furthermore, in the case where the arc tube is made of quartz glass, quartz glass has a higher transmittance than that of ceramic materials, and thus a point light source with which a substantial emission region is small can be realized easily. In addition, in the case where the metal halide enclosed in the arc tube includes an alkaline metal halide, a high-intensity discharge lamp (metal halide lamp) having emission characteristics of high-intensity and excellent color rendering properties can be realized easily.

According to the present invention, when a start-up voltage is applied across the pair of electrodes, the trigger wire is turned to be in a conductive state with respect to one of the electrodes. Therefore, the breakdown voltage can be lowered, and changes in the lamp characteristics can be prevented. As a result, the lamp lifetime of the high-intensity discharge lamp provided with the trigger wire can be prolonged.

This and other advantages of the present invention will become apparent to those skilled in the art upon reading and understanding the following detailed description with reference to the accompanying figures.

DETAILED DESCRIPTION OF THE INVENTION

Figure 1:
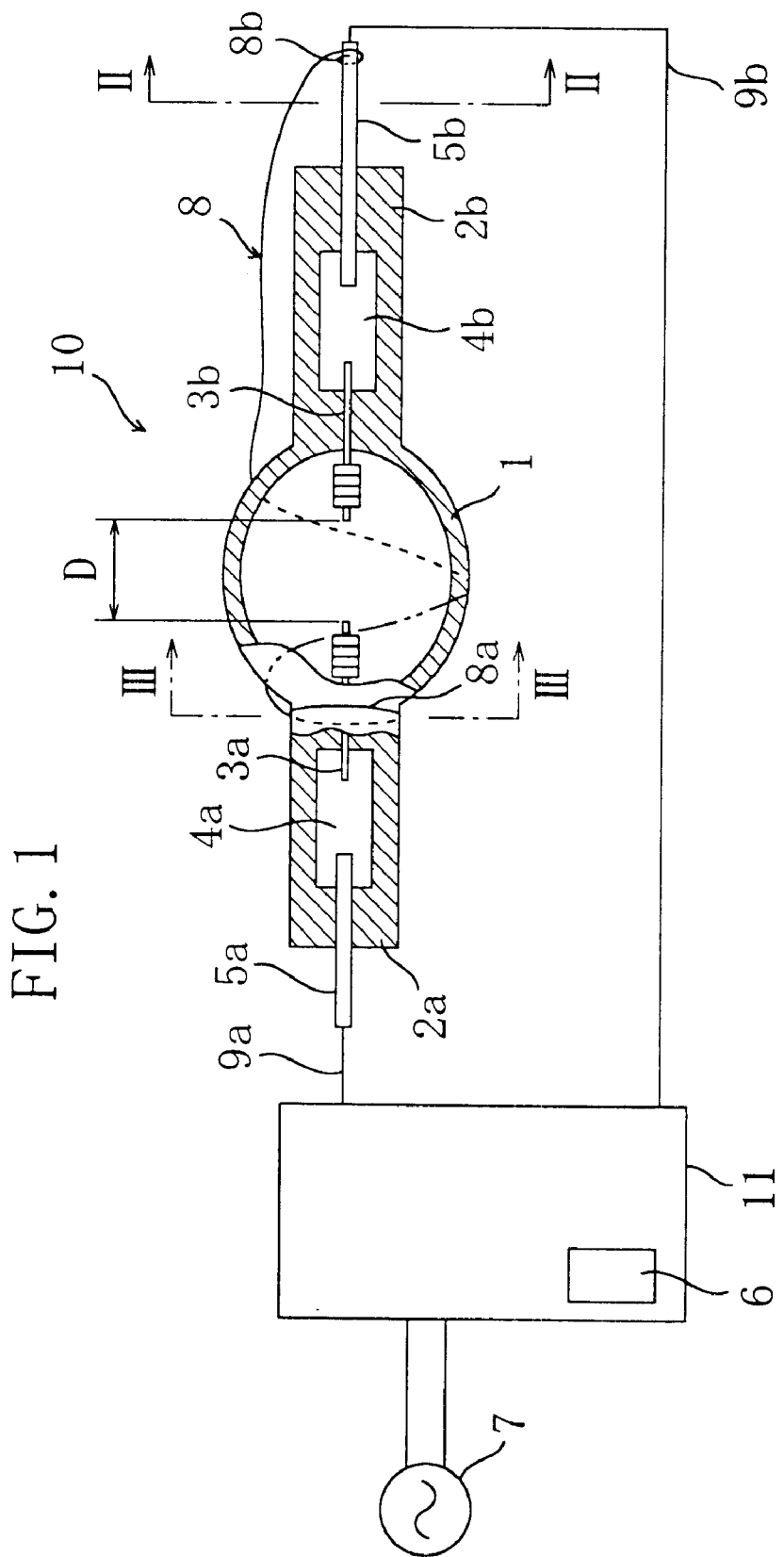
FIG. 1 is a cross-sectional view schematically showing the configuration of a metal halide lamp of Embodiment 1 according to the present invention.

Hereinafter, embodiments of the present invention will be described with reference to the accompanying drawings. In the following drawings, for simplification, elements having substantially the same function bear the same reference numerals. The present invention is not limited to the following embodiments.

Embodiment 1

Figure 2:
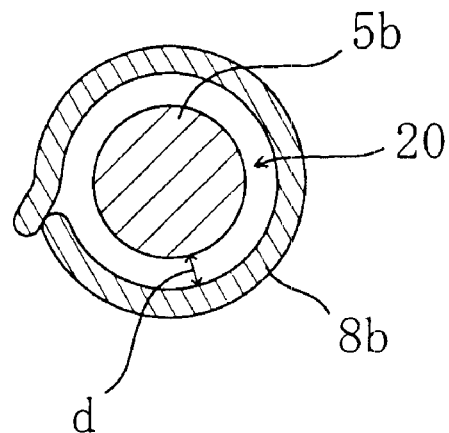
FIG. 2 is a cross-sectional view taken along line II—II of FIG. 1.
Figure 3:
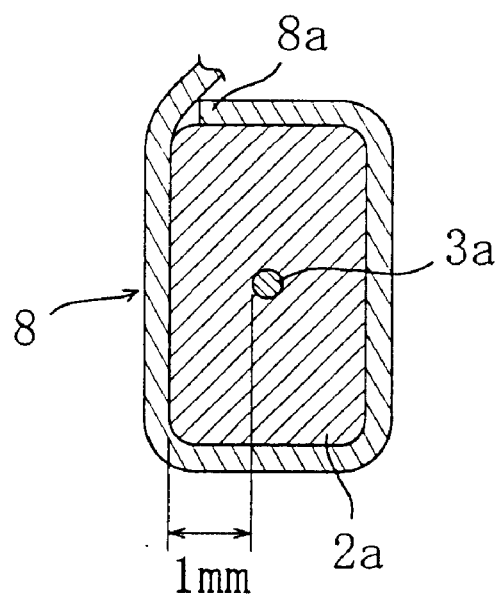
FIG. 3 is a cross-sectional view taken along line III—III of FIG. 1.

A high-intensity discharge lamp of Embodiment 1 according to the present invention will be described with reference to FIGS. 1 to 7. FIG. 1 is a schematic view of cross-sectional configuration of a high-intensity discharge lamp of this embodiment. FIG. 2 is cross-sectional view taken along line II—II of FIG. 1, and FIG. 3 is cross-sectional view taken along line III—III of FIG. 1.

A high-intensity discharge lamp 10 of this embodiment is a metal halide lamp including a metal halide as the luminous material. The metal halide lamp 10 shown in FIG. 1 includes an arc tube (luminous bulb) 1 in which a pair of electrodes 3a and 3b are opposed to each other, and electrode sealing portions 2a and 2b for sealing both ends of the arc tube 1. A trigger wire 8 made of a conductive material (e.g., platinum wire) having a first end 8a and a second end 8b is spirally wound around the circumferential surface of the arc tube 1, and the first end 8a thereof is positioned near the electrode 3a. The arc tube 1 in this embodiment is a spheroidal transparent vessel made of quartz glass, and the inside of the vessel constitutes a discharge space. The outer diameter of the central portion of the arc tube 1 is 6.0 mm, the thickness is 1.6 mm, and the inner volume is 0.025 cc.

In the arc tube 1, $ScI_3$ (scandium iodide), NaI (sodium iodide), $InI_3$ (indium iodide), TlI (thallium iodide) as the luminous materials and Xe gas with 1.4 MPa as the start-up aid gas are enclosed. However, unlike the configuration shown in FIG. 11, Hg (mercury) is not enclosed in the arc tube 1 of this embodiment. More specifically, the high-intensity discharge lamp 10 of this embodiment is a so-called mercury-free metal halide lamp. It is of course possible that it can be used not only for a mercury-free metal halide lamp, but also for a mercury-containing metal halide lamp enclosing mercury. The start-up voltage tends to be higher in the mercury-free metal halide lamp than in the mercury-containing metal halide lamp. Therefore, it is more advantageous to apply the configuration with the trigger wire 8 to the mercury-free metal halide lamp. In other words, the effect of the trigger wire 8 on the reduction in the start-up voltage can be more significant. When constituting a metal halide lamp not containing mercury, it is preferable that a halide of indium (e.g., $InI_3$ and/or InI, preferably $InI_3$) is contained as a metal halide in order to increase the lamp voltage and lower the current for operating the lamp.

Figure 11:
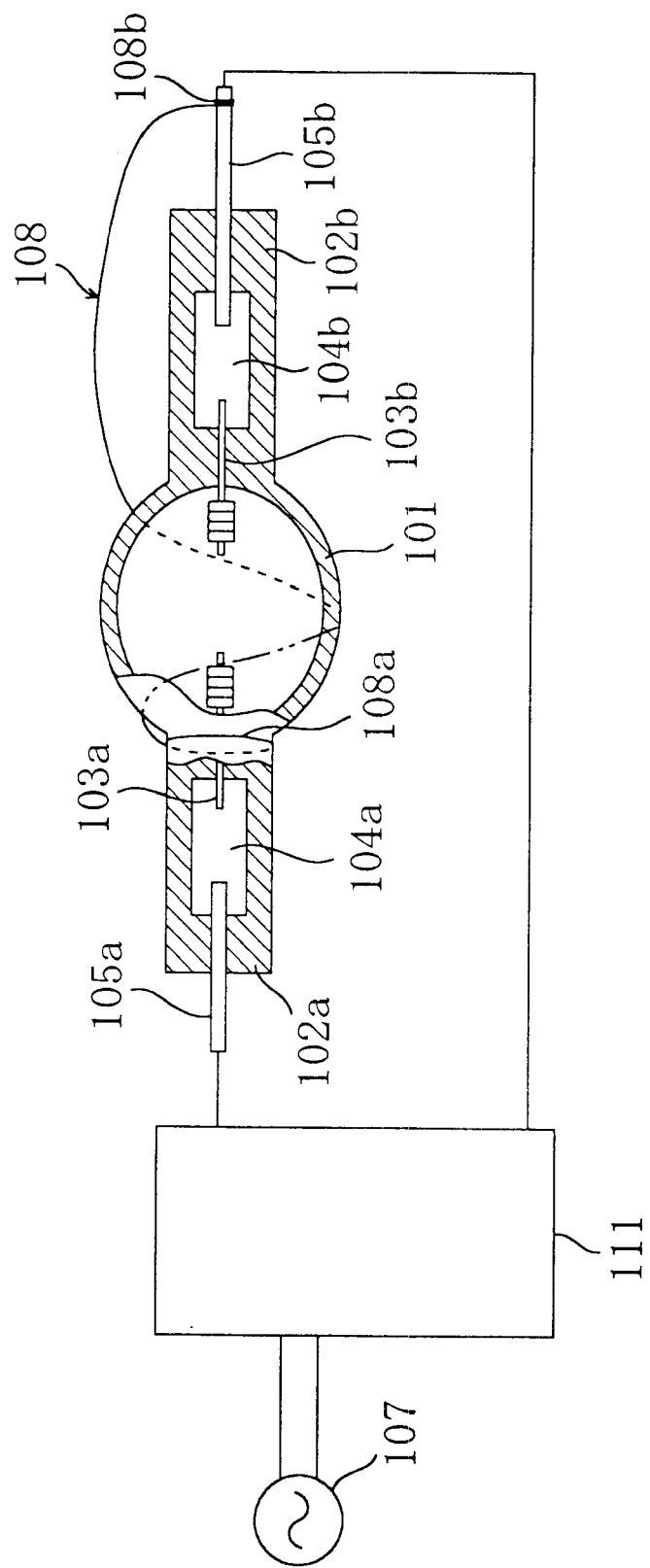
FIG. 11 is a cross-sectional view showing the configuration of a conventional metal halide lamp.

The metal halide lamp 10 emits light having an emission spectrum in the visible light region because of light emission of the metal halides in the arc tube 1. Although Na of the NaI is a very preferable luminous material in that the emission spectrum in a visible light region can be achieved, an alkaline metal having a small ion radius such as Na tends to move in the quartz glass and leak out of the arc tube in the configuration of the conventional metal halide lamp provided with a trigger wire (FIG. 11). In other words, in the conventional metal halide lamp provided with a trigger wire, it was difficult to use an alkaline metal halide as the metal halide in view of the lamp lifetime.

The electrodes 3a and 3b provided in the arc tube 1 are tungsten electrodes. The distance between the electrodes 3a and 3b is set to, for example, 3.7 mm. The pair of electrodes 3a and 3b are connected to external leads 5a and 5b via metal foils 4a and 4b provided in electrode sealing portions 2a and 2b. In this embodiment, the electrodes sealing portions 2a and 2b are formed of quartz glass and have a pinch seal structure. The cross-sectional contour thereof is substantially rectangular, as shown in FIG. 3. To obtain a higher sealing pressure resistance, the electrode sealing portions 2a and 2b can be of a shrink seal structure. In that case, the cross-sectional contour is substantially circular, for example.

The external lead wires 5a and 5b electrically connected to the pair of electrodes 3a and 3b are electrically connected to an operating circuit (driving device) 11 including a ballast 6 via wires 9a and 9b. The operating circuit 11 can output a high-voltage pulse voltage (start-up voltage) for start-up and a driving voltage (lighting operation voltage) for lighting operation, and is electrically connected to a power supply 7. More in detail, the operating circuit 11 outputs a high-voltage pulse voltage for starting the lamp, and then controls the current flowing through the metal halide lamp 10 so as not to flow at a predetermined amount or more during operation. In this embodiment, a high-voltage pulse voltage of 20 kV is output for a predetermined period that is preset by, for example, a timer (not shown) to start the lamp, whereas during operation, a voltage of 65V and a current of 0.54 A are output at a frequency of 150 Hz, so that the metal halide lamp 10 is turned on with a lamp power of 35 W.

The trigger wire 8 is turned to be conductive with the electrode 3b when the start-up voltage is applied across the pair of electrodes 3a and 3b. In other words, the relationship of the trigger wire 8 and the electrode 3b is changed from an insulating state to a conductive state when the start-up voltage is applied. In this embodiment, as shown in FIG. 2, the second end 8b of the trigger wire 8 is arranged close to the lead wire 5b in an insulating state (air insulation), and air is present as an insulator between the former and the latter (8b and 5b). This configuration causes insulation breakdown between the second end 8b of the trigger wire 8 and the lead wire 5b when a predetermined voltage (high-voltage pulse voltage) is applied across the external lead wire 5a and 5b from the operating circuit 11, and thus the second end 8b and the lead wire 5b have the same electric potential. In other words, only when the start-up voltage is applied, the trigger wire 8 becomes conductive with the electrode 3b via the external lead wire 5b. The distance d between the second end 8b of the trigger wire 8 and the external wire 5b is for example, less than 3 mm, preferably about 1 mm. The second end 8b of the trigger wire 8 can be spaced away from the external wire 5b, by fixing the second end 8b of the trigger wire 8 to the external wire 5b with, for example, an insulating fixing member.

Figure 4:
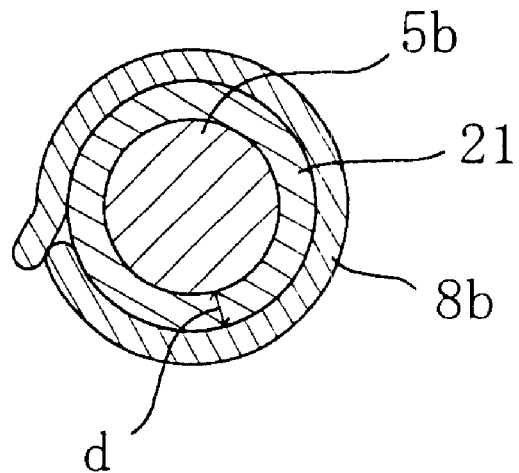
FIG. 4 is a cross-sectional enlarged view of a principal portion of a variation of the metal halide lamp of Embodiment 1.
Figure 5:
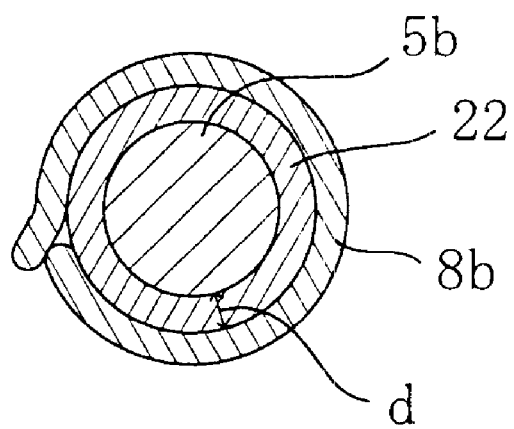
FIG. 5 is a cross-sectional enlarged view of a principal portion of a variation of the metal halide lamp of Embodiment 1.

Insulation can be achieved, not only by the air 20, but also by keeping the gap between the second end 8b of the trigger wire 8 and the external wire 5b in a vacuum state. Furthermore, as shown in FIG. 4, an insulating tape 21 can be wound around the external lead wire 5b. This configuration makes it possible to adjust the distance d easily by the number of winding of the tape 21. Furthermore, as shown in FIG. 5, the external lead wire 5b can be covered with a ceramic cylinder 22, and the second end 8b can be wound around the outer circumference of the cylinder with about one winding. In these cases, the distance d can be the same as in the case of the air insulation.

The first end 8a of the trigger wire 8 is wound around a region between the arc tube 1 and the sealing portion 2a, as shown in FIG. 3. In other words, the metal halide lamp 10 has a winding portion 8a for the trigger wire 8 at the end portion (near the base) of the sealing portion 2a on the arc tube 1 side. In this embodiment, the first end 8a of the trigger wire 8 and the electrode 3a sealed in the electrode sealing portion 2a are closely positioned with a distance of about 1 mm (the shortest distance) via the quartz glass of electrode sealing portion 2a.

Figure 6A:
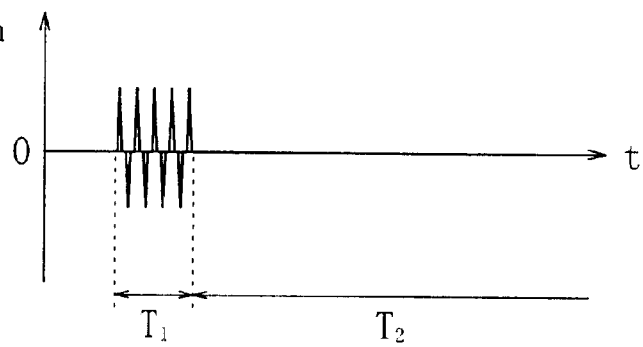
FIG. 6A is a graph schematically showing the waveform of the current flowing the trigger wire.
Figure 6B:
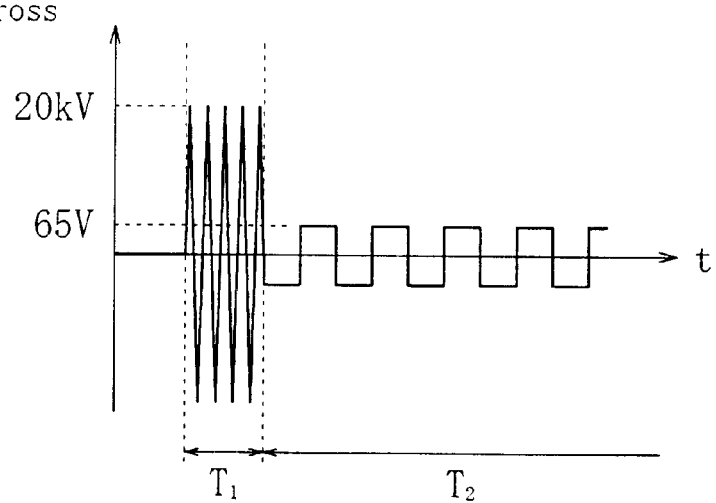
FIG. 6B is a graph schematically showing the waveform of the voltage applied to a pair of electrodes.

Next, the operation of the metal halide lamp 10 of this embodiment will be described with reference to FIGS. 6A and 6B. FIG. 6A is a graph schematically showing the waveform of the current flowing the trigger wire 8. FIG. 6B is a graph schematically showing the waveform of the voltage applied to the pair of electrodes 3a and 3 b.

First, during the start-up time ($T_1$) of the lamp, a high-voltage pulse voltage of 20 kV is output from the operating circuit 11 and applied across the electrodes 3a and 3b, as shown in FIG. 6B. The distance d between the external lead wire 5b and the second end 8b of the trigger wire 8 is comparatively short (e.g., about 1 mm), so that when a high-voltage pulse voltage is applied, insulation therebetween is broken, and the trigger wire 8 has the same electric potential as that of the electrode 3b, as shown in FIG. 6A. Thus, an electrical field having a larger electric potential gradient than that between the electrodes 3a and 3b occurs in the vicinity between the first end 8a of the trigger wire 8 and the electrode 3a. Therefore, the insulation breakdown of Xe gas in the arc tube 1 is facilitated, and insulation breakdown readily occurs between the electrodes 3a and 3b. As a result, the metal halide lamp is turned on (or discharge is started) reliably.

This on-state is maintained stably once started, even if the voltage is reduced. In other words, as shown in FIG. 6B, even if the output of the high pulse voltage from the operating circuit 11 is stopped, and a voltage of 65V and a current of 0.54 A are output at a frequency of 150 Hz ($T_2$), the on-state is maintained stably. On the other hand, as shown in FIG. 6A, during the steady-state operation of the lamp ($T_2$), the electric potential of the trigger wire 8 is in a floating state. In other words, in a state where a low voltage during the steady-state operation of the lamp ($T_2$) is output from the operating circuit 11, insulation breakdown does not occur between the second end 8b of the trigger wire 8 and the external lead wire 5b, and therefore, the second end 8b and the external lead wire 5b are in an insulating state, the electric potential of the trigger wire 8 is in a floating state. Consequently, the trigger wire 8 hardly affects the electrical field in the arc tube 1 during lamp operation, and thus this embodiment prevents the luminous material in the arc tube 1 from being attracted to the trigger wire 8 and from leaking from the inside of the arc tube 1.

In the configuration of this embodiment, the trigger wire 8 (in particular, the first end 8a) is provided, so that a comparatively low high-voltage pulse voltage of about 20 kV can start the metal halide lamp 10 reliably. Thus, the compactness and the reduction of the production cost of the operating circuit 11 can be achieved easily. In addition, since the trigger wire 8 has the configuration as shown above at the second end 8b, an electrical field due to the trigger wire 8 does not occur during lamp operation. Therefore, the leakage of the luminous material due to the influence of the electrical field can be prevented. As a result, color change due to the reduction of the luminous material or the increase of the lamp voltage can be prevented. Thus, the metal halide lamp 10 having stable characteristics and a long lifetime can be realized.

Next, a high-voltage pulse voltage (breakdown voltage) necessary to start the lamp will be described.

The inventors of the present invention measured the breakdown voltage with respect to the metal halide lamp 10 provided with the trigger wire 8 of Embodiment 1 and a metal halide lamp without the trigger wire 8. The metal halide lamp without the trigger wire 8 has the same configuration as that of the metal halide lamp 10 except that the trigger wire 8 is not provided.

The breakdown voltage was measured in the following manner. In starting the operation of the metal halide lamps by applying a high-voltage pulse voltage to the lamps, when the breakdown occurs between the electrodes 3a and 3b to start discharge, then the voltage across the electrodes 3a and 3b is significantly dropped at the moment the lamp is turned on. Using this phenomenon, the peak voltage at this time was measured as the breakdown voltage necessary for insulation breakdown. In the case where this measurement is repeated, the metal halide lamp 10 is left undisturbed for 15 minutes or more after turned off, and then the lamp operation is started again in the state where the lamp is sufficiently cold in order to eliminate the influence of the temperature.

Table 1 shows the measurement results of the breakdown voltage. In the case where the trigger wire 8 is provided, the distance d between the second end 8b and the external lead wire 5b is 1 mm. Table 1 also shows the measurement result of the metal halide lamp of Embodiment 2 described later.

TABLE 1

| Lamps for measurement | Breakdown voltage (kV) |
| --- | --- |
| Metal halide lamp of Embodiment 1 | 12.3 |
| Metal halide lamp of Embodiment 2 | 12.2 |
| Metal halide lamp without trigger wire | 20.8 |

As shown in Table 1, the breakdown voltage of the metal halide lamp without the trigger wire 8 is 20.8 kV, the breakdown voltage of the metal halide lamp provided with the trigger wire 8 is 12.3 kV, which is significantly reduced. With a breakdown voltage of about 15 kV or less, the lamp can be started reliably under commonly used conditions.

Considering about ±30% variations due to the ambient temperature of the lamp and the ballast, the temperature of the lamp itself, the position of the metal halide (concentration distribution) in the arc tube and the state of the electrodes, a high-voltage pulse voltage of about 20 kV or less only needs to be applied from the operating circuit 11.

The operating circuit 11 generating a high-voltage pulse voltage of about 20 kV or less can easily achieve compactness and low cost of the circuit, and can provide high utility in the current market.

In the case of the metal halide lamp without the trigger wire 8, the measured breakdown voltage is 20.8 kV, and therefore it is necessary to apply a high-voltage pulse voltage exceeding 20 kV. An operating circuit generating such a high high-voltage pulse voltage has to be produced in a special specification, and the circuit configuration becomes large-scale because components having a high withstand voltage are used, thus leading to high cost. Therefore, such a metal halide lamp has low utility in the market.

Next, the distance between the second end 8b of the trigger wire 8 and the external lead wire 5b will be described. The inventors of the present invention conducted a test as follows. The distance d (shortest distance) between the second end 8b of the trigger wire 8 and the external lead wire 5b in the metal halide lamp 10 of this embodiment is set to various values in the range from 0.5 mm to 4 mm, and a high-voltage pulse voltage of 15 kV is applied to start the lamp in the same manner as described above. Table 2 shows the results of the test to start the lamp. This test was conducted with the configuration where the insulating tape 21 is provided as shown in FIG. 4.

TABLE 2

| | Distance d (mm) | | | | | | | |
|---|---|---|---|---|---|---|---|---|
| | 0.5 | 1.0 | 1.5 | 2.0 | 2.5 | 3.0 | 3.5 | 4.0 |
| Starting Test results | G | G | G | G | G | N | N | N |

(G: turned on; N: not turned on)

As shown in Table 2, when the distance d between the second end 8b of the trigger wire 8 and the external lead wire 5b was less than 3 mm (e.g., 2.5 mm to 0.5 mm), the lamp was turned on reliably. However, in the case of 3 mm or more, the lamp was not turned on. The reason why the lamp was not turned on seems be that when the distance d is large, insulation breakdown does not occur, so that the electric potential of the trigger wire 8 is not the same as that of the external lead wire 5b. In general and regular lamps, by setting the distance d to less than 3 mm, the start-up properties can be satisfactory. However, the distance d is not limited thereto, and can be set as appropriate, depending on various conditions. For example, depending on the arrangement of the trigger wire 8, the type of the insulator, the distance between the electrodes 3a and 3b, the applied voltage or the like, the distance d can be set suitably such that insulation breakdown occurs only when a high-voltage pulse voltage is applied.

The second end 8b of the trigger wire 8 is not necessarily disposed close to the external lead wire 5b, but can be disposed close to a portion to which a high voltage for starting the lamp is applied, such as a wire 9b. Furthermore, the end of the trigger wire 8 is not necessarily disposed close to the external lead wire 5b, but the other portions such as the center of the trigger can be disposed close thereto.

Next, the lifetime of the lamp will be described. The inventors of the present invention conducted a test regarding the lamp lifetime with respect to the metal halide lamp 10 (see FIG. 1) of this embodiment where the second end 8b of the trigger wire 8 is disposed close to the external lead wire 5b and a metal halide lamp where the trigger wire 108 is connected to one of the external lead wires 105b, and has the same electric potential as that of one of the electrodes 103b constantly, even during lamp operation (Comparative Example; see FIG. 11 regarding the configuration of the trigger wire 108). The constitutions of the enclosed materials are the same in the two lamps. In the lifetime test, the influence of the trigger wire was examined with the two lamps that has been on for 250 hours. Table 3 shows the results of the lifetime test. Table 3 shows a typical example of ten tests of each lamp.

TABLE 3

| | change after initial test | | | |
|---|---|---|---|---|
| Lamps for measurement | Color temperature (K) | Lamp voltage (V) | Luminous flux maintenance factor (%) | Devitrification |
| Metal halide lamp | 4000 → 4300 | 67 → 67 | 98 | Not observed |
| Comparative Example | 4000 → 6500 | 60 → 120 | 50 | Observed |

As shown in Table 3, in the metal halide lamp of Comparative Example, a large change in the color temperature (4000K to 6500K) was observed after 250 hours operation, and the lamp voltage was increased (from 60V to 120V). The lamp that has been widely changed in color, that is, from 4000K to 6500K in the color temperature, is turned to be a defective lamp that cannot be used for a headlight of automobiles. Furthermore, the devitrification phenomenon that the arc tube becomes opaque and the transparency is lost was observed. Furthermore, the luminous flux maintenance factor was reduced to 50%.

Such significant degradation in the performance occurs in the conventional configuration, presumably because the electric potential of the trigger wire 108 is the same as that of the electrode 103b. In other words, during lamp operation, the trigger wire 108 has the same electric potential as that of the electrode 103b, and therefore an electric potential having a large electric potential gradient is formed between the first end 108a of the trigger wire 108 and the electrode 103a. Therefore, the ionized luminous material in the arc tube is attracted to the trigger wire 108, and especially sodium, which has a small ion radius and can move in the quartz glass, leaks out of the arc tube 101. As a result, significant degradation occurs. Furthermore, since the amorphous structure of the quartz glass is broken while sodium or the like is moving in the quartz glass, opaqueness and devitrification of the quartz glass are caused.

On the other hand, in the metal halide lamp 10 of this embodiment, the electric potential of the trigger wire 8 is in a floating state during lamp operation. Therefore, an electrical field having a large electric potential gradient is not formed, so that the luminous material does not leak out. As a result, the change in the color temperature, the increase in the lamp voltage and the reduction in the luminous flux maintenance factor hardly occur, and devitrification does not occur in the arc tube 1. Consequently, a long lifetime of the lamp can be achieved.

In this embodiment, when a start-up voltage is applied, the insulating state between the trigger wire 8 and the electrode 3b is changed to the conductive state. Therefore, the breakdown voltage can be lowered, and the change in the lamp characteristics can be prevented. As a result, the metal halide lamp 10 having a long lamp lifetime can be provided. More in detail, discharge readily occurs between the pair of electrodes 3a and 3b by the influence of the electrical field formed between the trigger wire 8 and the electrode 3a by establishing the conductive state between the trigger wire 8 and the electrode 3b during the start-up. Therefore, a comparatively low voltage easily can start the lamp operation. In addition, the trigger wire 8 and the electrode 3b is in the conductive state only during the start-up, and during operation, a large electrical field does not occur in the vicinity of the trigger wire 8. Consequently, the ionized material (e.g., sodium ions) enclosed in the arc tube 1 is not attracted to the trigger wire 8, does not move inside the bulb wall of the arc tube 1 nor leaks out. Therefore, the amount of the enclosed material is not reduced, or the amorphous structure is not broken, which might occur when ions are moving inside the bulb wall of the arc tube. Therefore, the change in the color temperature, the increase in the lamp voltage, the reduction in the luminous flux maintenance factor, the devitrification of the arc tube are not caused and a long lifetime of the lamp can be achieved.

Furthermore, in this embodiment, when the trigger wire 8 is provided with a close portion (8b) to the external lead wire 5b, and a start-up voltage (high-voltage pulse voltage) is applied during the start-up, then a high voltage is applied to the trigger wire 8 because of insulation breakdown. Therefore with a simple configuration, the reduction of the breakdown voltage and the effect of prevention of the lamp characteristics change can be obtained.

In order to apply a high voltage to the trigger wire 8, not only the configuration utilizing insulation breakdown, but also for example, a configuration using a switching element such as bimetal can be used. In other words, a switching element can be used to connect the trigger wire 8 to a high voltage power supply only during the start-up.

However, in the case where bimetal is used, the temperature of the lamp before operation may prevent satisfactory switching operation when turning on the lamp again. Therefore, in addition to the advantage of simple configuration, also in view of reliable operation, the above configuration using insulation breakdown is highly advantageous. In this embodiment, the electric potential of the trigger wire 8 is the same as that of the electrode 3b during the start-up. However, the present invention is not limited thereto, and the electric potential of the trigger wire 8 is not necessarily the same as that of the electrode 3b. Any electric potential can be used as long as it can start discharge between the electrodes 3a and 3b by the electrical field formed between the first end 8a and the electrode 3a.

Embodiment 2

Figure 7:
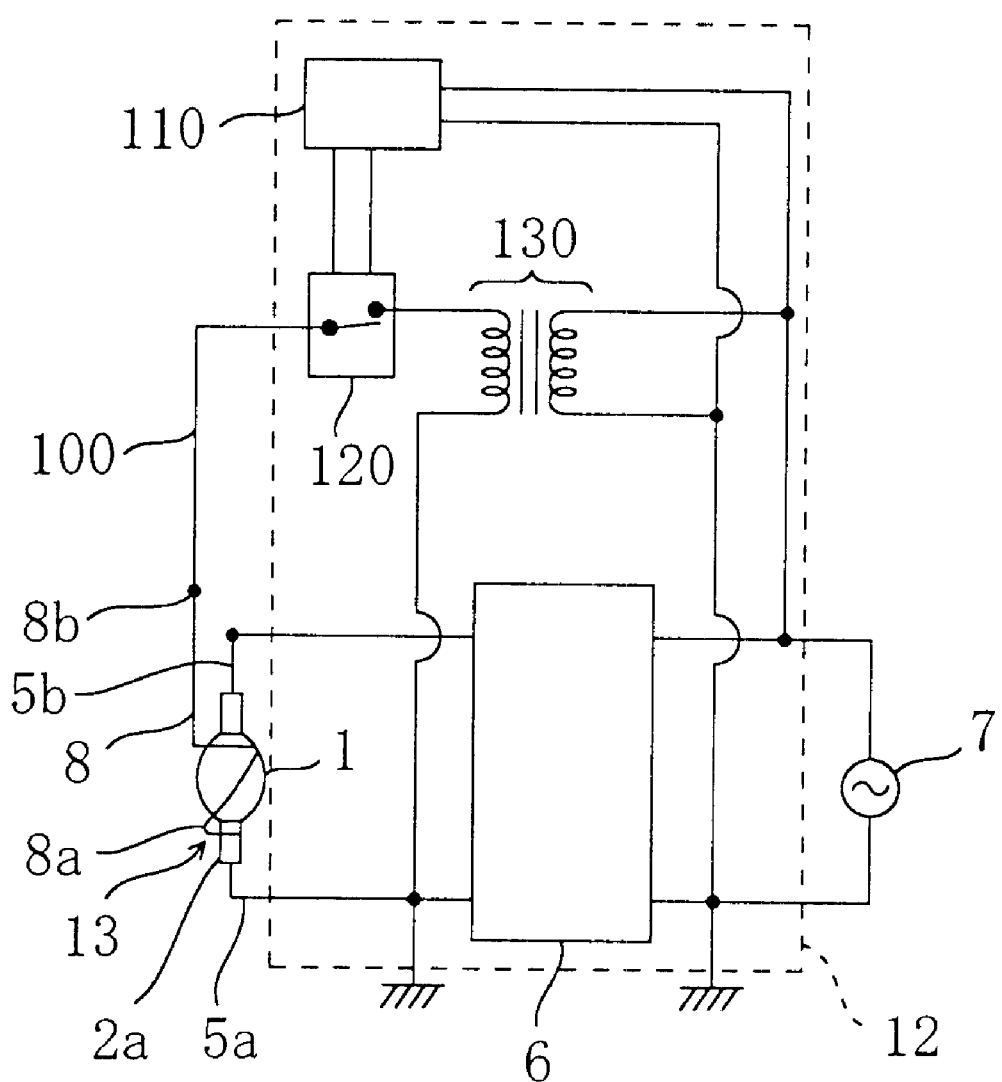
FIG. 7 is a view schematically showing the configuration of a high-intensity discharge lamp operating apparatus of Embodiment 2.

Embodiment 2 of the present invention will be described with reference to FIGS. 7 and 8. FIG. 7 schematically shows the circuit configuration of a high-intensity discharge lamp operating apparatus of the present invention.

The high-intensity discharge lamp operating apparatus shown in FIG. 7 includes a metal halide lamp 13 and an operating circuit 12 for operating the metal halide lamp 13. In the configuration of this embodiment as in Embodiment 1, a high-voltage pulse voltage is applied to the trigger wire 8 wound around the lamp 13 only during the start-up. However, this embodiment is different from Embodiment 1 in that a high-voltage pulse voltage for the start-up is applied only to the trigger wire 8, and the same voltage (driving voltage) as during operation is applied across the pair of electrodes 3a and 3b of the lamp during the start-up. Furthermore, this embodiment is different in that application of a high-voltage pulse voltage is achieved not by the insulation breakdown from the external lead wire 5b, but the control by the operating circuit (driving circuit) 12. Other aspects are the same as in Embodiment 1, so that description thereof will be omitted or simplified.

The operating circuit 12 shown in FIG. 7 is different from the operating circuit 11 of Embodiment 1 in that the driving voltage for operating the lamp is output independently of the high-voltage pulse voltage for starting the lamp operation. In other words, the voltage for operating the lamp is output from the power supply 7 via a ballast 6 of the operating circuit 12. On the other hand, for the high-voltage pulse voltage for starting the lamp operation, the voltage of the power supply 7 is increased by a step-up transformer 130, and output via a relay 120. The relay 120 is controlled by a timer circuit 110 so as to be on for a predetermined time (e.g., one second) after the start of the start-up operation.

The metal halide lamp 13 is provided with the trigger wire 8 whose first end 8a is wound around the base of the electrode sealing portion 2a, as in the metal halide lamp 10 of Embodiment 1. However, the second end 8b of the trigger wire 8 is not provided close to the external lead wire 5b, but is electrically connected to the relay 120 of the operating circuit 12 via a wire 100. Furthermore, the external lead wire 5a and 5b are electrically connected to the ballast 6 of the operating circuit 12.

Figure 8A:
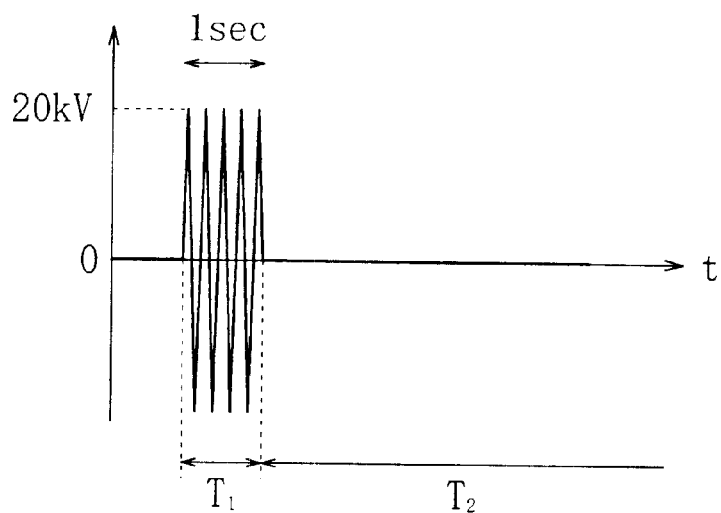
FIG. 8A is a graph schematically showing the waveform of the current flowing the trigger wire.
Figure 8B:
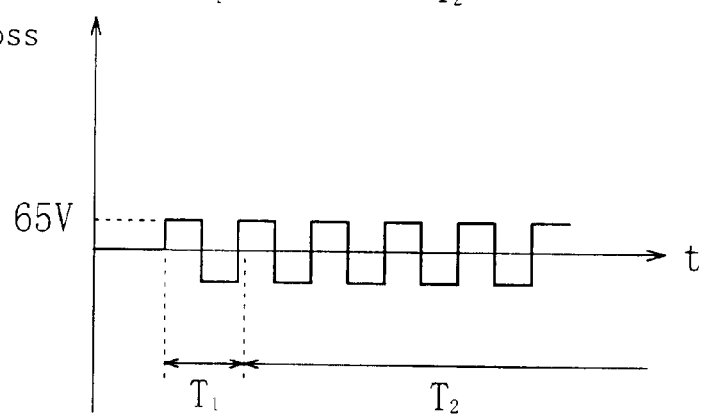
FIG. 8B is a graph schematically showing the waveform of the voltage applied to a pair of electrodes.

Next, the operation of this embodiment will be described also with reference to FIG. 8. FIG. 8A is a graph schematically showing the waveform of the voltage applied to the trigger wire 8. FIG. 8B is a graph schematically showing the waveform of the voltage applied across the pair of electrodes 3a and 3b.

As shown in FIGS. 8A and 8B, during the start-up of the lamp ($T_1$), in the state where the driving voltage (e.g., 65V) output from the ballast 6 is applied across the external lead wires 5a and 5b, a high-voltage pulse voltage (e.g., 20 kV) output from the step-up transformer 130 is applied to the trigger wire 8. Thus, an electrical field having a large electric potential gradient occurs in the vicinity of the first end 8a of the trigger 8 inside the arc tube 1, and the insulation breakdown of Xe gas is facilitated. Therefore, with a lower start-up voltage, discharge is started with the driving voltage applied across the external lead wires 5a and 5b, and thus the lamp is turned on.

When one second has passed since a start-up operation is started, the relay 120 is turned off by the control of the timer circuit 110, so that the electric potential of the trigger wire 8 is in a floating state ($T_2$). Therefore, as in Embodiment 1, an electrical field having a large electric potential is not formed between the trigger wire 8 and the discharge electrode during operation, so that the luminous material does not leak out. Consequently, the change in the color temperature, the increase in the lamp voltage and the reduction in the luminous flux maintenance factor hardly occur, and devitrification does not occur in the arc tube 1. Consequently, a long lifetime of the lamp can be achieved. Furthermore, in the configuration of this embodiment, a high-voltage pulse voltage is not applied across the pair of electrodes 3a and 3b, so that damages such as depletion due to melt deformation or evaporation of the electrode during the start-up can be prevented or reduced.

For the metal halide lamp 13 of this embodiment, the breakdown voltage was measured in the same manner as in Embodiment 1. As shown in Table 1, the breakdown voltage was 12.2V. In other words, compared to the metal halide lamp without the trigger wire, the breakdown voltage can be reduced significantly. Furthermore, when the lifetime test was carried out, as in the metal halide lamp 10 of the Embodiment 1, the phenomenon that an alkaline metal such as sodium as the luminous material leaks out of the arc tube 1 was not observed, and it was found that stable characteristics and a long lamp lifetime can be obtained.

Figure 9:
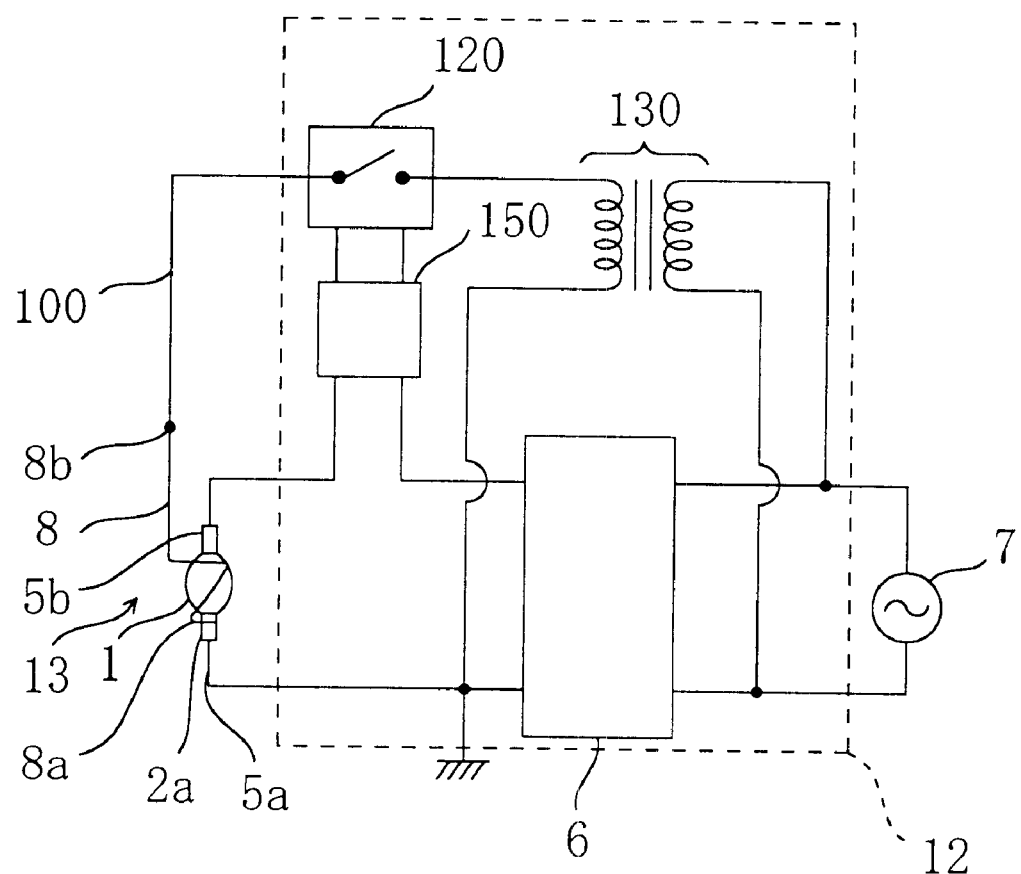
FIG. 9 is a view schematically showing the configuration of a variation of the high-intensity discharge lamp operating apparatus of Embodiment 2.

The configuration shown in FIG. 7 can be modified to the configuration shown in FIG. 9. FIG. 9 shows the circuit configuration of a variation of Embodiment 2.

In the configuration shown in FIG. 9, the control of the relay 120 for applying a high-voltage pulse voltage only during the start-up is performed by operation detecting means 150 for detecting that the lamp is turned on, instead of the timer circuit 110. As the operation detecting means 150, for example, a current detector for detecting the lamp current can be used. Describing the operation more specifically, discharge between the discharge electrodes is started by applying a high-voltage pulse voltage to the trigger wire 8. Then, for example, when a lamp current of 0.3 A or more is detected by the current detector 150, the relay 120 is turned off, so that a high-voltage pulse voltage is not applied to the trigger wire 8.

Figure 10:
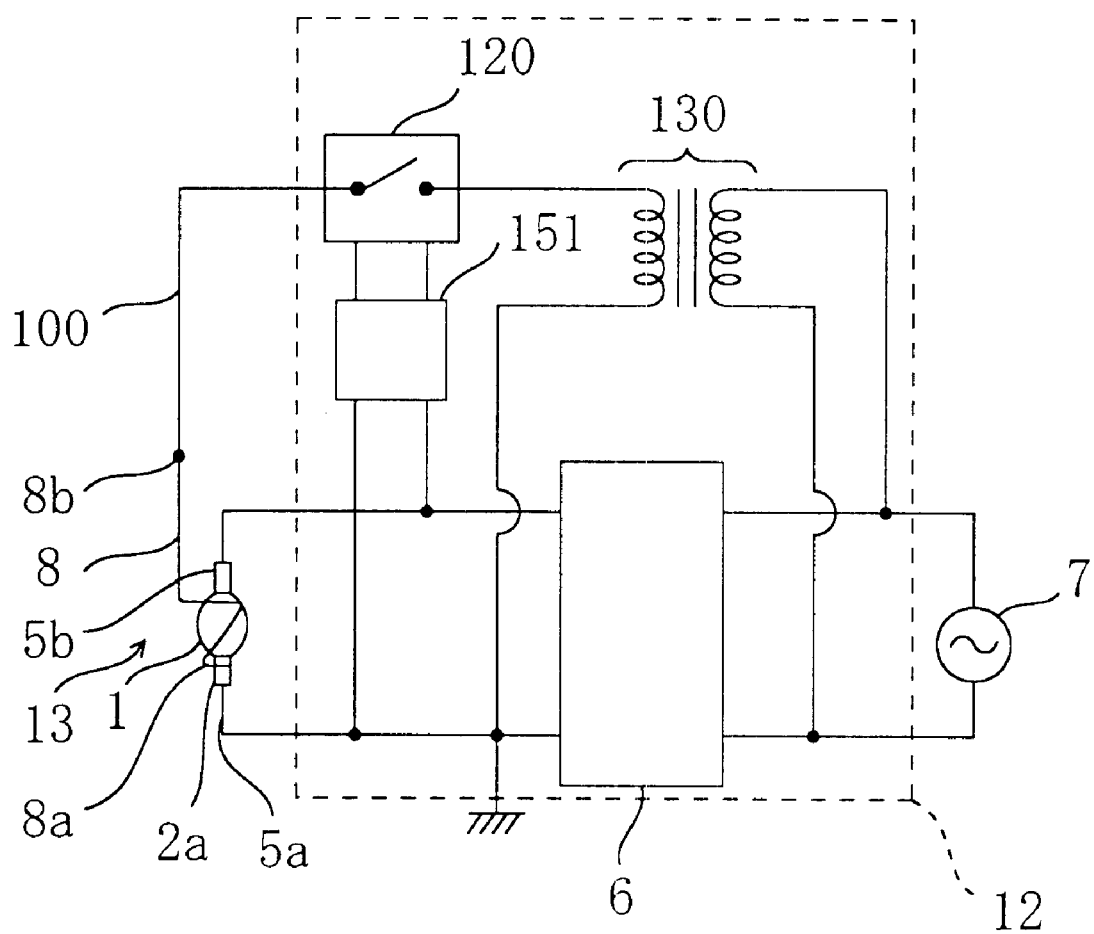
FIG. 10 is a view schematically showing the configuration of a variation of the high-intensity discharge lamp operating apparatus of Embodiment 2.

Furthermore, as shown in FIG. 10, the operating circuit 15 can be configured such that a voltage detector 151 for detecting the lamp voltage is used as the operation detecting means to control the relay 120. When the discharge is not started between the discharge electrodes, the output voltage from the ballast 6 is a predetermined open circuit voltage (e.g., 350V), and when discharge is started, the lamp voltage is for example, about 65V. Utilizing this change in the voltage to detect that the lamp operation is started, a high-voltage voltage pulse voltage can be applied to the trigger wire 8 only during the start-up. Furthermore, in order to detect that the lamp operation is started, an optical sensor can be used.

In the above embodiments, the arc tube 1 is made of quartz glass, but the present invention is not limited thereto and the arc tube made of a ceramics materials can be used. However, compared to the arc tube made of quartz glass, the arc tube made of a ceramic material is, so-called obscure glass, so that a point light source is difficult to achieve. In other words, for ceramic arc tubes of obscure glass, the entire of the arc tube is luminous, so that it is difficult to obtain a point light source. Therefore, it is preferable to use the arc tube made of quartz glass for applications requiring a point light source such as a headlight of automobiles.

Furthermore, the present invention has been described by taking the metal halide lamp as an example, but is not limited thereto, and the present invention can be applied to various high-intensity discharge lamp (e.g., high pressure mercury lamp) having a similar discharge mechanism. In other words, from the viewpoint that the leakage of the luminous material such as sodium can be prevented, the advantage is large when the present invention is applied to metal halide lamps, but the present invention can be applied suitably to other high-intensity discharge lamps (HID) such as high pressure mercury lamps, high pressure sodium lamps or the like.

The xenon gas pressure, the inner volume of the arc tube 1, the distance between the electrodes, a combination of metal halides such as scandium iodide and sodium iodide in the above embodiments are only illustrative. Therefore, for example, the inner volume of the arc tube 1 is not limited to 0.025 cc, or the distance between the electrodes is not limited to 3.7 mm. Other combinations of metal halides can be used. Xenon gas is enclosed in the arc tube 1 for the purpose of aiding to start the lamp operation in the above embodiments. However, xenon gas is suitable as a rare gas only in the viewpoint of an application to a headlight of automobiles, but other rare gases than xenon, for example, argon gas can be used. Similarly, the lamp power is not limited to 35 W. The high-intensity discharge lamp in the above embodiments can be used not only for a headlight for automobiles, but for general illumination or other applications. For example, the present invention can be used as a light source for image projecting apparatus such as projectors using liquid crystal or a DMD. Furthermore, the present invention can also be used for sports stadiums or floodlights illuminating road signs.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A high-intensity discharge lamp comprising:
   an arc tube including a pair of electrodes opposed to each other therein; and
   a trigger wire made of a conductive material provided in an outer circumference of the arc tube,
   wherein a part of the trigger wire is arranged close to an external lead wire in an insulating state, the external lead wire being electrically connected to one electrode of the pair of electrodes, and
   only when a start-up voltage is applied, insulation breakdown is caused between the part of the trigger wire and the external lead wire to establish the conductive state.

2. The high-intensity discharge lamp according to claim 1, wherein
   the part of the trigger wire is arranged close to the external lead wire within a distance of less than 3 mm.

3. The high-intensity discharge lamp according to claim 1, wherein the part of the trigger wire is insulated from the external lead wire with air.

4. The high-intensity discharge lamp according to claim 1, wherein an insulating tape is provided between the part of the trigger wire and the external lead wire for insulation.

5. The high-intensity discharge lamp according to claim 1, further comprising a pair of sealing portions for sealing ends of the pair of electrodes, the sealing portions extending from the arc tube,
   wherein the trigger wire is wound around a region between the arc tube and one of the pair of sealing portions that seals an end of the other electrode.

6. The high-intensity discharge lamp according to claim 1, wherein the arc tube is made of quartz glass.

7. The high-intensity discharge lamp according to claim 1,
   wherein a metal halide is enclosed as a luminous material in the arc tube, and
   the metal halide includes an alkaline metal halide.

8. The high-intensity discharge lamp according to claim 7, wherein the alkaline metal halide is a sodium halide.

9. A high-intensity discharge lamp operating apparatus, comprising:
   a high-intensity discharge lamp comprising: an arc tube including a pair of electrodes opposed to each other therein; and a trigger wire made of a conductive material provided in an outer circumference of the arc tube;

an operating circuit for operating the high-intensity discharge lamp, wherein the trigger wire is not electrically connected to either one of the pair of electrodes, the operating circuit comprises:

driving voltage applying means for applying a driving voltage for maintaining discharge after the discharge is started between the pair of electrodes; and start-up voltage applying means for applying a start-up voltage for starting discharge between the pair of electrodes, wherein the trigger wire is electrically connected to the driving voltage applying means and each of the pair of electrodes is electrically connected to the driving voltage applying means, wherein the start-up voltage applying means comprises a timer for controlling the start-up voltage applying means so as to apply the start-up voltage to the trigger wire for a predetermined time during start-up.

10. A high-intensity discharge lamp operating apparatus, comprising:

a high-intensity discharge lamp comprising: an arc tube including a pair of electrodes opposed to each other therein; and a trigger wire made of a conductive material provided in an outer circumference of the arc tube;

an operating circuit for operating the high-intensity discharge lamp, wherein the trigger wire is not electrically connected to either one of the pair of electrodes, the operating circuit comprises:

driving voltage applying means for applying a driving voltage for maintaining discharge after the discharge is started between the pair of electrodes; and start-up voltage applying means for applying a start-up voltage for starting discharge between the pair of electrodes, wherein the trigger wire is electrically connected to the driving voltage applying means and each of the pair of electrodes is electrically connected to the driving voltage applying means, wherein the start-up voltage applying means comprises:

detecting means for detecting that lamp operation is started by discharge between the pair of electrodes; and controlling means for stopping application of the start-up voltage when the detecting means detects that lamp operation is started.

11. The high-intensity discharge lamp operating apparatus according to claim 10, wherein the detecting means is a voltage detector that detects a change in voltage between the pair of electrodes.

12. The high-intensity discharge lamp operating apparatus according to claim 10, wherein the detecting means is a current detector that detects a change in current flowing between the pair of electrodes.

* * * * *